United States Patent
Swartz et al.

(10) Patent No.: US 9,712,055 B1
(45) Date of Patent: Jul. 18, 2017

(54) ZERO VOLTAGE SWITCHING ENERGY RECOVERY CONTROL OF DISCONTINUOUS PWM SWITCHING POWER CONVERTERS

(71) Applicant: Picor Corporation, North Smithfield, RI (US)

(72) Inventors: Chris R. Swartz, South Kingstown, RI (US); John Clarkin, Coventry, RI (US)

(73) Assignee: Picor Corporation, North Smithfield, RI (US)

( * ) Notice: Subject to any disclaimer, the term of this patent is extended or adjusted under 35 U.S.C. 154(b) by 0 days.

(21) Appl. No.: 14/919,571

(22) Filed: Oct. 21, 2015

(51) Int. Cl.
G05F 1/00 (2006.01)
H02M 3/158 (2006.01)
H02M 3/156 (2006.01)

(52) U.S. Cl.
CPC .......... H02M 3/158 (2013.01); H02M 3/156 (2013.01)

(58) Field of Classification Search
CPC ...... H02M 3/156; H02M 3/157; H02M 1/083; G01R 19/0084
USPC ................. 323/222, 234, 235, 271, 282–285
See application file for complete search history.

(56) References Cited

U.S. PATENT DOCUMENTS

| | | |
|---|---|---|
| 4,720,667 A | 1/1988 | Lee et al. |
| 5,321,348 A | 6/1994 | Vinciarelli et al. |
| 5,663,635 A * | 9/1997 | Vinciarelli ............ H02M 3/155 323/224 |
| 5,668,466 A | 9/1997 | Vinciarelli et al. |
| 6,522,108 B2 | 2/2003 | Prager et al. |
| RE40,072 E | 2/2008 | Prager et al. |
| 8,669,744 B1 * | 3/2014 | Vinciarelli .......... H02M 3/1582 323/235 |
| 2007/0109822 A1 | 5/2007 | Kuan |

OTHER PUBLICATIONS

Firmansyah et al., An Active-Clamped Full-Wave Zero-Current-Switched Quasi-Resonant Boost Converted in Power Factor Correction Application, Applied Power Electronics Confernce and Exposition, 2010 25 Annual IEEE, Oct. 2015, 6 pages.
Stratakos et al., Low Voltage CMOS DC-DC Converter for a Portable Battery-Operated System, Power Electronics Specialist Conference, PESC'94 IEEE, Jun. 20-25, 1994, 8 pages.

* cited by examiner

*Primary Examiner* — Nguyen Tran
(74) *Attorney, Agent, or Firm* — Foley & Lardner LLP

(57) ABSTRACT

Buck and boost power converter topologies and methods of converting power are provided. One method provides switching power conversion circuitry including an inductor and switches and clamp circuitry connected across the inductor. Control circuitry operates the switches and the clamp circuitry in a series of converter operating cycles which may include: (a) an energy transfer interval for transferring energy input to output via the inductor; (b) an energy recovery phase, during which the inductor current oscillates transitioning from substantially zero to a negative value, from the negative value to a positive value, and from the positive value toward zero; and (c) a clamp phase, during a portion of which the clamp circuitry is ON, energy is trapped in the inductor, the inductor current is negative, and is not zero at the end of the clamp phase.

25 Claims, 9 Drawing Sheets

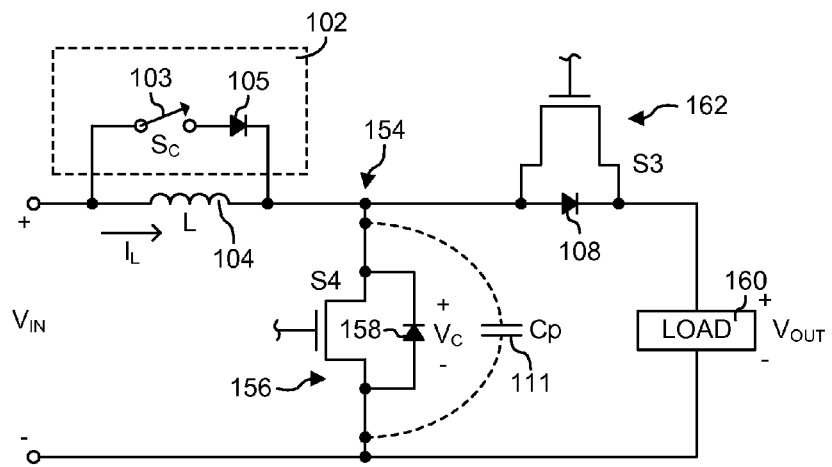
FIG. 8
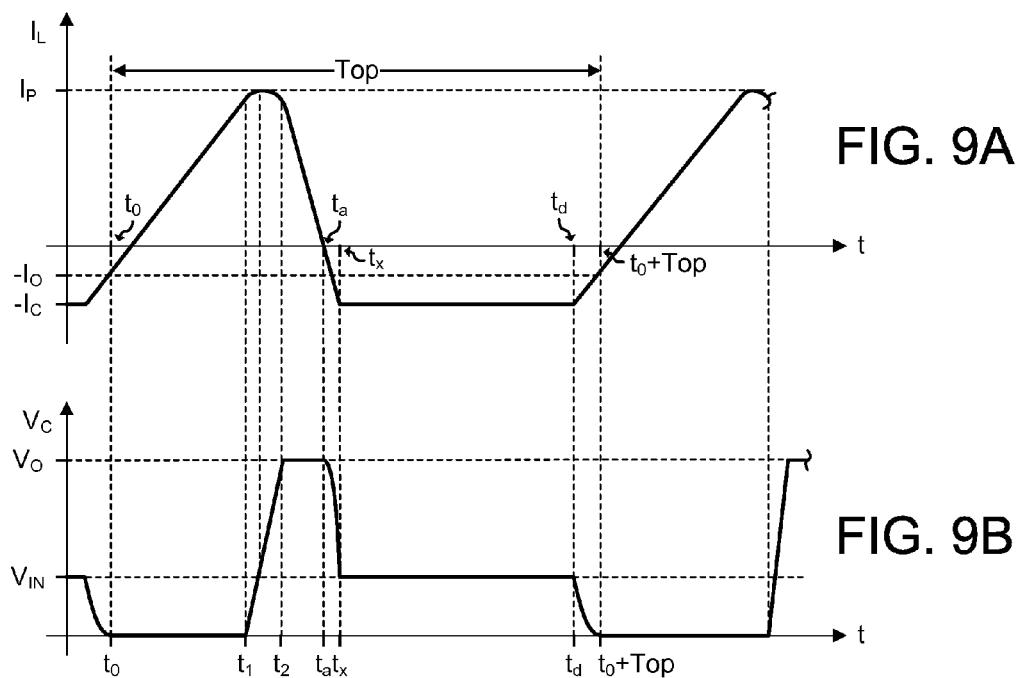
FIG. 9A
FIG. 9B ly shows the
ZERO VOLTAGE SWITCHING ENERGY RECOVERY CONTROL OF DISCONTINUOUS PWM SWITCHING POWER CONVERTERS

BACKGROUND

This invention relates to reducing losses and improving performance of discontinuous mode switching power converters.

SUMMARY

One exemplary method of converting power includes providing switching power conversion circuitry including an inductor and one or more switches connected to deliver energy from an input source to an output at an output voltage during a converter operating cycle. The method further includes providing clamp circuitry connected across the inductor arranged to conduct a current flowing in the inductor when ON and control circuitry configured to operate the one or more switches and the clamp circuitry in a series of converter operating cycles. The converter operating cycles may include (a) an energy transfer interval, during which energy is transferred from the input to the output via the inductor, and which is characterized by: (i) a substantially zero current flowing in the inductor at the beginning of the interval; (ii) an average positive flow of current in the inductor during the interval, the average being taken over the duration of the interval; (iii) a reversal in polarity of a voltage across the inductor during the interval, and (iv) a substantially zero current flowing in the inductor at the end of the interval. The converter operating cycles may further include (b) an energy recovery phase, during which the current flowing in the inductor oscillates and which is characterized by the current flowing in the inductor transitioning from (i) substantially zero to a first negative value, (ii) from the first negative value to a first positive value, and (iii) from the first positive value toward zero; and (c) a clamp phase, during which energy is trapped in the inductor, and which is characterized by: (i) an average negative current flowing in the inductor during the phase, the average being taken over the duration of the clamp phase; (ii) the magnitude of negative current flowing in the inductor at the end of the clamp phase is greater than zero; and (iii) the clamp circuitry is ON for at least a portion of the phase.

One exemplary system includes switching power conversion circuitry including an inductor and one or more switches connected to deliver energy from an input source to an output at an output voltage during a converter operating cycle. The system further includes clamp circuitry connected across the inductor arranged to conduct a current flowing in the inductor when ON and control circuitry configured to operate the one or more switches and the clamp circuitry in a series of converter operating cycles. The converter operating cycles may include (a) an energy transfer interval, during which energy is transferred from the input to the output via the inductor, and which is characterized by: (i) a substantially zero current flowing in the inductor at the beginning of the interval; (ii) an average positive flow of current in the inductor during the interval, the average being taken over the duration of the interval; (iii) a reversal in polarity of a voltage across the inductor during the interval, and (iv) a substantially zero current flowing in the inductor at the end of the interval. The converter operating cycles may further include (b) an energy recovery phase, during which the current flowing in the inductor oscillates and which is characterized by the current flowing in the inductor transitioning from (i) substantially zero to a first negative value, (ii) from the first negative value to a first positive value, and (iii) from the first positive value toward zero; and (c) a clamp phase, during which energy is trapped in the inductor, and which is characterized by: (i) an average negative current flowing in the inductor during the phase, the average being taken over the duration of the clamp phase; (ii) the magnitude of negative current flowing in the inductor at the end of the clamp phase is greater than zero; and (iii) the clamp circuitry is ON for at least a portion of the phase.

DESCRIPTION OF DRAWINGS

FIG. 8 shows a boost converter comprising clamp circuitry.

FIGS. 9A and 9B show waveforms for the converter of FIG. 8.

DETAILED DESCRIPTION

Figure 1:
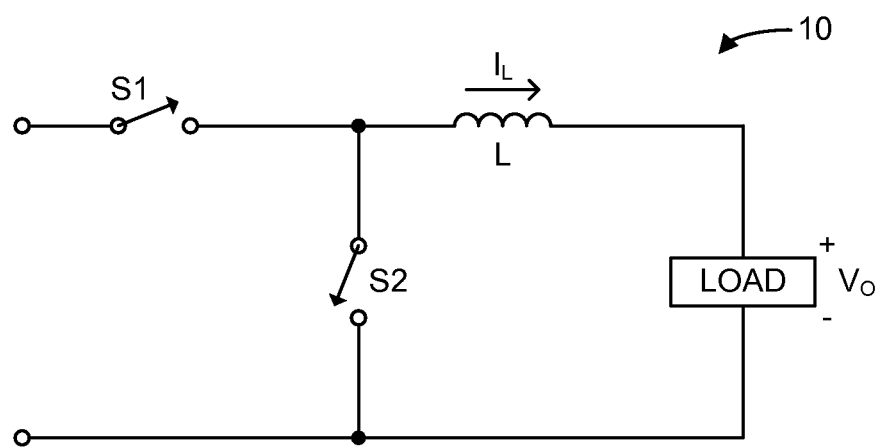
FIG. 1 shows a buck converter topology.
Figure 2:
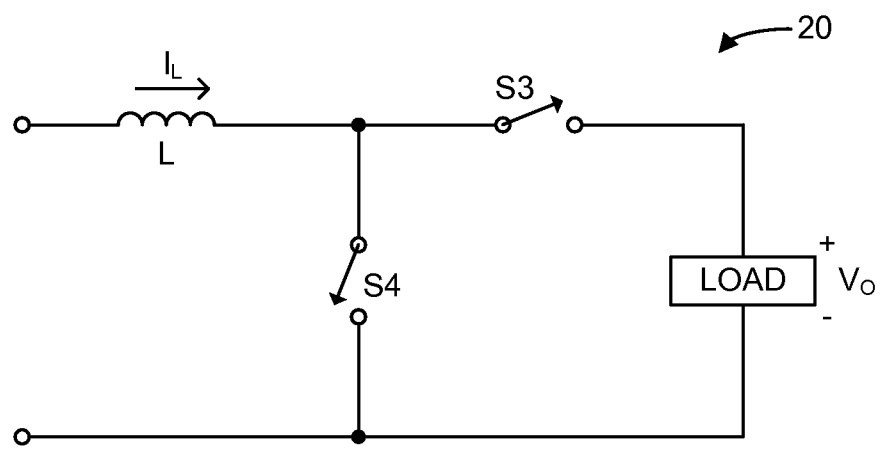
FIG. 2 shows a boost converter topology.

FIGS. 1 and 2 respectively show non-isolated buck 10 and boost 20 pulse-width-modulated ("PWM") DC-DC converter topologies. As shown, each converter has an input for receiving power from a unipolar input source, e.g. voltage source, Vin; one or more switches, i.e. switches S1 through S4; and an inductive element, L. In each of the topologies, the converter output voltage, Vo, or the converter output current may be controlled by controlling the timing of the ON and OFF intervals of the switches during each of a series of converter operating cycles. In some embodiments, some of the switches may be replaced by diodes, e.g., switches S2 and S3 in FIGS. 1 and 2 may be replaced by diodes; or the switches may be supplemented by a diode connected across the switch, such as the intrinsic body drain diode of a MOSFET used as a switch.

Figure 5:
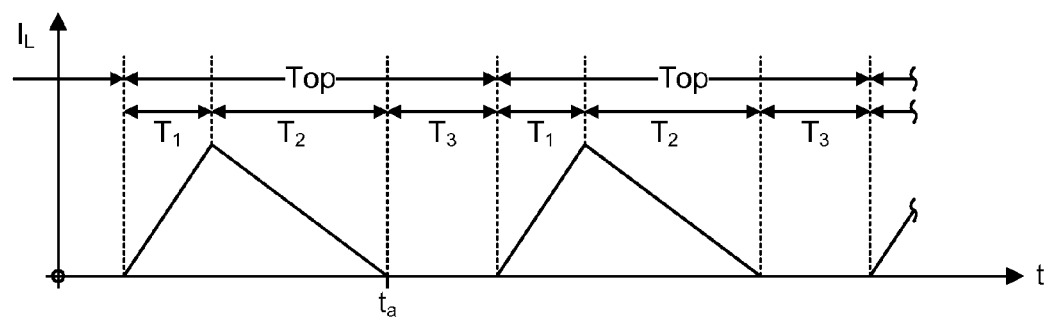
FIG. 5 shows a current waveform in an idealized buck or boost converter operating in a discontinuous-conduction mode.

Each PWM converter may be configured and controlled to operate in a "discontinuous" mode, meaning the current, $I_L$, flowing in the inductive element, L, returns to zero or reverses polarity during each converter operating cycle. Referring to FIG. 5, an idealized waveform shows the current, $I_L$, flowing in the inductive element of an idealized (ideal switches, no parasitic capacitances or inductances, and no losses) buck 10 or boost 20 converter (FIGS. 1, 2) operating in discontinuous mode with a converter operating cycle having a period, Top. During the time interval T1, switch S1 (S4) is ON and switch S2 (S3) is OFF. Conversely, during time interval, T2, switch S1 (S4) is OFF and switch S2 (S3) is ON. Both switches are OFF during the time interval T3. As shown in FIG. 5, the current, $I_L$, is positive for a portion of each operating cycle and returns to zero prior to the end of the operating cycle.

A clamp switch may be used to retain or trap energy in the inductive element, L, as a means of reducing noise and switching losses in the discontinuous switching power converters as described in: Prager et al, Loss and Noise Reduction in Power Converters, U.S. Reissue Pat. No. Re 40,072, reissued Feb. 19, 2008, assigned to VLT, Inc. (the "Reverse Recovery Patent"); in Vinciarelli, Adaptive Control of Switching Losses in Power Converters, U.S. Pat. No. 8,669, 744 issued Mar. 11, 2014, assigned to VLT, Inc. (the "Adaptive ZVS Patent"); and in Clarkin et al, Apparatus and Methods for Control of Discontinuous-Mode Power Converters, U.S. patent application Ser. No. 13/794,588 filed Mar. 11, 2013, assigned to Picor Corp. (the "Back-to-Back Clamp Application"); each of which is incorporated herein by reference in its entirety.

Figure 6:
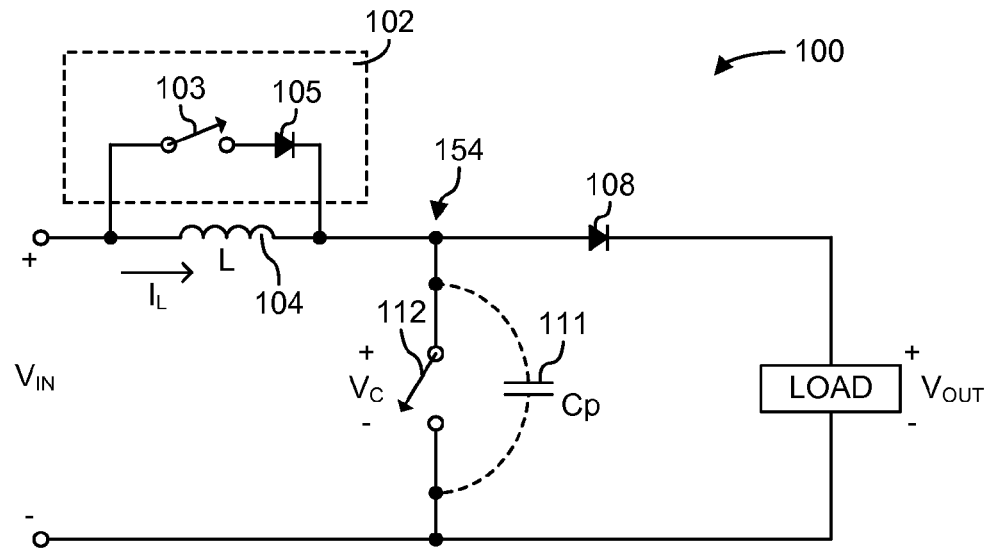
FIG. 6 shows a boost converter comprising clamp circuitry.
Figure 7:
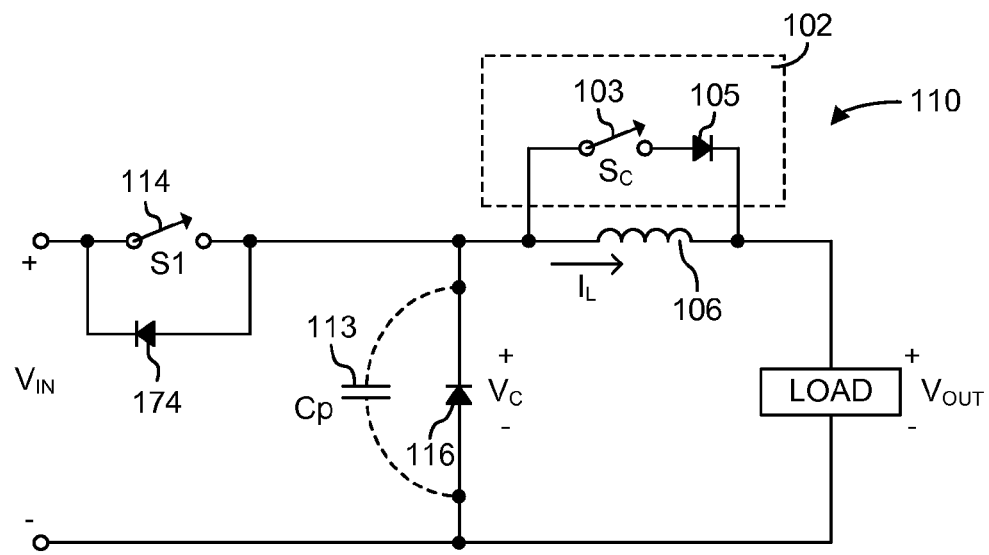
FIG. 7 shows a buck converter comprising clamp circuitry.

FIGS. 6 and 7 respectively show a boost converter 100 and a buck converter 110 including a clamp circuit 102 of the kind described in the Reverse Recovery Patent. As shown, each converter 100, 110, includes a clamp circuit 102 (including clamp switch 103 and a diode 105) connected across its respective inductive element 104, 106. The diodes 108 and 116 in FIGS. 6 and 7 may be replaced by or augmented with a switch operated preferably as a synchronous rectifier.

Figure 4:
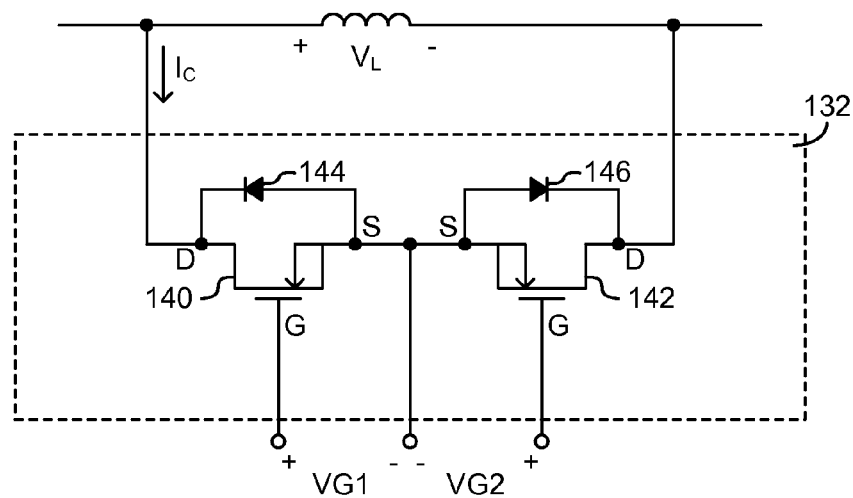
FIG. 4 shows a clamp circuit.

FIG. 4 shows an improved clamp circuit 132 of the kind disclosed in The Back-to-Back Application. As shown in FIG. 4, the clamp circuit 132 comprises MOSFETs 140, 142, each MOSFET comprising a respective diode 144, 146 (which may be an intrinsic diode or a discrete diode). In operation, MOSFET 142 may preferably be turned ON coincident with, or shortly after, diode 146 begins conducting negative inductor current, thereby reducing losses in the clamp circuit.

The amount of energy stored in the inductor during the clamp phase may be adaptively adjusted as a means of enabling zero-voltage switching of one or more converter switches over a relatively wide range of converter operating conditions as described in the Adaptive ZVS Patent.

FIG. 8 shows a discontinuous boost converter comprising a clamp circuit 102, which may alternatively be of the kind shown in FIG. 4. Capacitance, Cp 111, may comprise parasitic and other capacitances associated with the node labeled 154. Switches S4 156 and S3 162 may be MOSFETs comprising body diodes 158, 108 as shown. A controller (not shown in FIG. 8) controls the timing of the switches S3 162, S4 156, and Sc 103 as a means of regulating the voltage, Vout, across the load 160. FIGS. 9A and 9B respectively show waveforms of the voltage, Vc, across Cp 111 and S4 156, and the current, $I_L$, in inductor L 104 when operated with a clamped phase.

Between time t0 and t1, switch S4 is ON and energy is accumulated in inductor L 104. The inductor current, $I_L$, reaches a peak value, Ip, at time t1, at which time switch S4 is turned OFF. Ideally, the inductor current will be zero at time t0 when switch S4 is turned ON. However, a negative current may flow in the inductor at time t0 ($I_L = -I_0$ in FIG. 9A), due to excess clamp current or early turn ON of switch S4, causing the initial portion of the interval between time t0 and t1 to be used to bring the inductor current back to zero before forward energy may be stored in the inductor. The interval generally between times t0 and t1, and more specifically from when the inductor current reaches zero (around time t0) to time t1, may be called an "energy storage phase" because energy from the source is stored in the inductor. Between times t1 and t2 the positive flow of $I_L$ charges the capacitance Cp, until, at time t2, Vc equals Vout and (assuming ideal circuit elements) diode 108 conducts, enabling $I_L$ to flow into the load (switch S3 may be turned ON any time between time t2 and ta, to reduce loss associated with (non-ideal) diode 108). Between times t2 and ta, a voltage equal to (Vout–Vin) is impressed across the inductor L 104, causing $I_L$ to decline as energy is transferred to the load. The interval between time t2 and ta may be called an energy transfer phase. At time ta (FIG. 9A) the inductor current declines to zero, (assuming ideal circuit elements) diode 108 ceases conduction (and switch S3 is OFF) and Vc=Vo. The interval between time t0 and ta, which in the discontinuous boost example includes the energy storage phase and the energy transfer phase, may be called an energy transfer interval. Clamp switch 103 may be turned ON any time between t2 and ta. Between times ta and tx, Cp resonates with inductor L causing Vc to decline and the current $I_L$ to increase negatively, as shown in FIGS. 9A and 9B. When Vc rings down to equal Vin, at time tx, (assuming ideal circuit elements) diode 105 in clamp circuit 102 becomes forward biased and the clamp circuit conducts the current $I_L$, beginning a clamp phase. Between times tx and td the clamp circuit carries the negative inductor current of magnitude Ic (FIG. 9A). At time td the clamp circuit is disabled by turning the clamp switch 103 OFF, ending the clamp phase. Between times td and $t_0$+Top, Cp is discharged by the flow of $I_L$, causing the voltage Vc to decline, ideally to zero volts for full ZVS of switch S4, however, any significant reduction, e.g. by 50 percent, 80 percent, 90 percent, or more from the peak voltage (Vc=Vin prior to the discharge of Cp), respectively reduces the switching loss during turn ON of switch S4 by 75 percent, 96 percent, 99 percent, or more. A new operating period may begin at time $t_0$+Top with the closure of switch S4.

Assuming a fixed operating period, Top, the magnitude of the peak positive current, Ip, may be controlled to increase with increasing load, whereas the magnitude of the negative clamped current, Ic, which determines the degree to which Cp is discharged during the interval between td and $t_0$+Top, is proportional to (Vout–Vin) and is essentially independent of load. For the boost converter of FIGS. 8 and 9, Ic will be large enough to fully discharge Cp if the boost ratio is Vout/Vin≥2, thereby enabling zero-voltage switching of S4; if Vout/Vin<2 full discharge will not occur, switch S4 will not turn ON at zero voltage, and switching losses will increase as the ratio of Vout/Vin decreases toward unity. Achieving zero-voltage switching is therefore a function of converter operating conditions.

In the clamped converter of FIGS. 8 and 9, ZVS cannot be achieved, and losses in the converter will increase, for boost ratios between unity and two. One way to achieve ZVS under such circumstances, as described in the Adaptive ZVS Patent, uses a controller to enable switch S3 162 to remain ON for a controlled period of time after the inductor current has declined to zero (i.e., after the energy transfer or freewheeling phase ends at time ta, FIG. 9A), thereby increasing the magnitude of the clamp current, Ic, and providing sufficient energy to fully discharge the capacitance, Cp, prior to turning switch S4 ON.

The amount of energy stored in the inductor of the boost converter shown in FIG. 8 and operated as shown in FIGS. 9A and 9B during the clamp phase increases as the boost ratio increases above a value of two, which increases losses in non-ideal circuit elements during the clamp phase and affects the amount of time in each operating period during which the positive inductor current, $I_L$, flows. At a boost ratio equal to two, the magnitude, $I_C$, is (ideally) just sufficient to cause $I_L$ to decline to zero at the same time that the node voltage, $V_C$, declines to zero. The operating condition at which full ZVS is achieved simultaneously with the complete discharge of the energy stored in the inductor, L, i.e. zero energy remains in the inductor, may be called the "optimal ZVS" condition. Under such optimal ZVS conditions, a new operating period begins (i.e., at times $t_0$ and $t_o$+Top, FIG. 9A) with zero inductor current ($I_L$=0). For boost ratios greater than two, however, $I_C$ is greater than that which is required to fully discharge the node capacitances, Cp, resulting in a residual negative inductor current, −Io, flowing in switch S4 (or in its body diode 158) at the beginning of the new operating period, as shown in FIG. 9A. Flow of negative current during the time that S4 is ON does not contribute to forward energy transfer and increases losses. It also alters the transfer function of the converter. In an ideal converter, with zero or relatively small negative current flow, the converter transfer function is principally a function of Vin and Vout, enabling open-loop and feed-forward control techniques (as described, e.g., in the Adaptive ZVS Patent) to be applied using measurements of Vin and Vout alone. When significant reverse current flows during a portion of the cycle, however, the converter transfer function is affected by that current, thereby adding complexity to measurements and calculations associated with feed-forward and open-loop control techniques. It should be appreciated that the effects of excessive clamp current are exacerbated at high boost ratios and at low load currents, where the clamp period may be relatively long and the ratio of the peak forward inductor current to the peak reverse clamp current, Ip/Ic, may be relatively small.

The issues described above for the clamped discontinuous boost converter also apply to other clamped discontinuous PWM converter topologies, including, e.g., clamped discontinuous buck converters. In the clamped discontinuous buck converter (FIG. 7), optimal ZVS occurs when the buck ratio, Vout/Vin, is equal to one-half (0.5) and excess clamp current increases as the buck ratio increases above one-half. For buck ratios below one-half, there is insufficient energy to fully discharge parasitic capacitance 113 (FIG. 7). A way to achieve ZVS under these circumstances is described in the Adaptive ZVS Patent.

ZVS Energy Recovery

Figure 10:
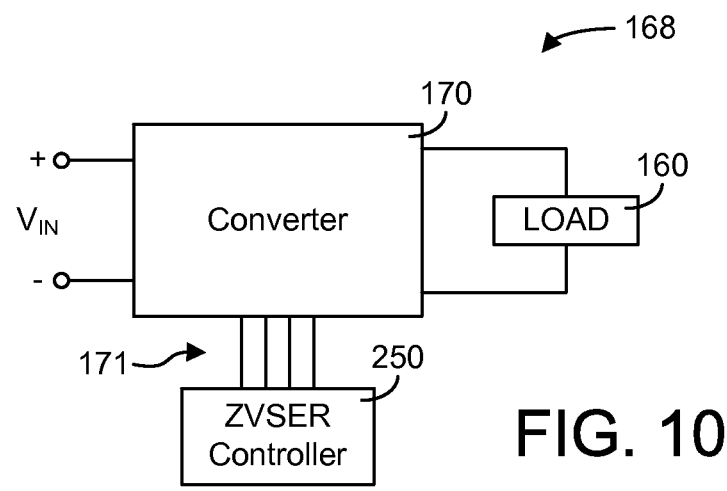
FIG. 10 shows a block diagram of a power converter according to the invention.

FIG. 10 shows a power converter 168, comprising a clamped discontinuous mode pulse-width modulated power converter 170 and a Zero-Voltage Switching Energy Recovery Controller 250 ("ZVSER controller") connected (e.g. connections 171 in FIG. 10) to sense operating conditions and adjust control of the switches in the converter 170. The converter 170 in FIG. 10 may comprise any discontinuous-mode pulse-width-modulated power converter topology (e.g. the discontinuous boost converter shown in FIG. 6, the discontinuous buck converter shown in FIG. 7, the discontinuous boost converter shown in FIG. 8, or variations of those topologies that includes a clamp circuit, such as the clamp circuit 102 (shown in FIGS. 6, 7, and 8), Back-to-Back clamp circuit 132 (shown in FIG. 4 and described in the Back-to-Back Clamp Application), or variations of the above mentioned inductive clamp circuits such that energy is trapped in the inductor.

For operating under conditions which would result in more clamp current than is required for optimal ZVS transitions (e.g. in a clamped discontinuous boost converter with a boost ratio greater than two), the ZVSER controller may, as described in greater detail below, delay the timing of the enabling of the clamp circuitry in converter 168 in order to reduce the magnitude of inductor current, $I_L$, during the clamp period to a value lower than that which would flow if the clamp circuit were operated with the timing described earlier and shown in FIGS. 9A and 9B.

Boost Converter ZVSER Example

Figures 11A, 11B:
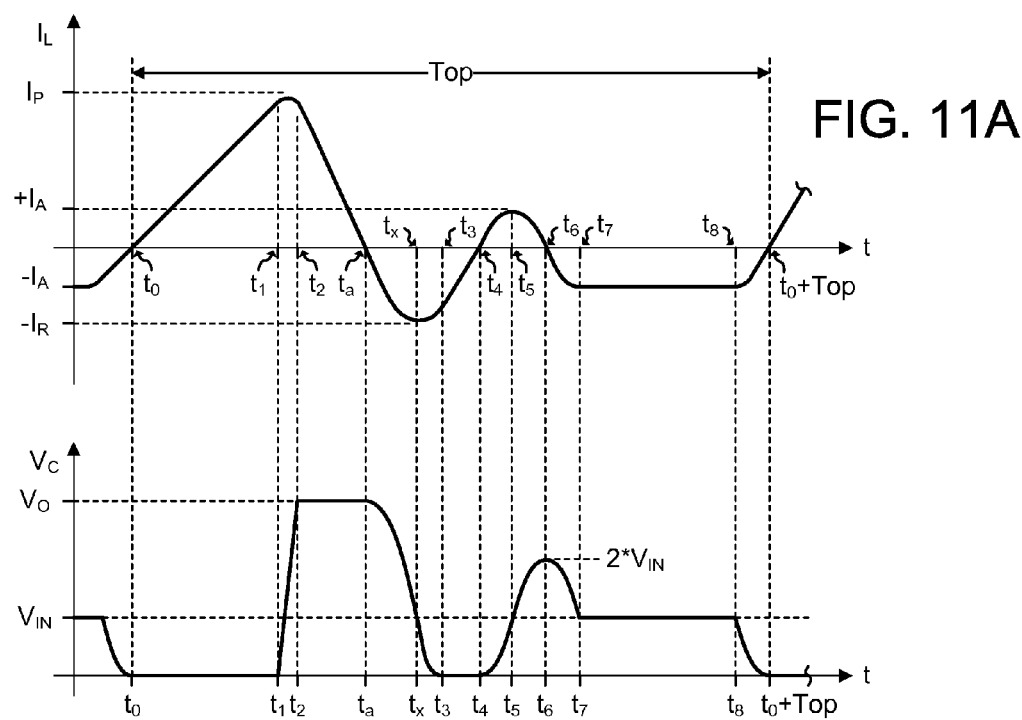
FIGS. 11A and 11B show waveforms for a clamped discontinuous mode boost switching power converter according to the invention.

In a first boost converter example, the clamped discontinuous mode pulse-width modulated converter 170 may use the clamped boost converter topology shown in FIG. 8. Operation of the (ideal) converter (FIGS. 8 and 10) is explained with reference to the waveforms in FIGS. 11A and 11B, which respectively show the inductor current, $I_L$, and the node voltage, Vc, across switch S4 and node capacitances, Cp, 111. At time t0, switch S4 156 may be closed initiating the converter operating period. From time $t_0$ to time ta (during the energy transfer interval), operation of the boost converter with the ZVSER controller is the same as in the converter described above in connection with FIGS. 8, 9A, and 9B (except that in the ZVSER example as shown in FIG. 11, the inductor current, $I_L$, has ideally declined in magnitude to zero at time t0).

Energy Recovery Interval

At time ta, the inductor current $I_L$ reaches zero and switch S3 162 may be turned OFF. The interval from t2 to ta may be called an "energy transfer phase" or a "freewheeling phase" because there is a positive flow of inductor current, $I_L$, which transfers energy from the inductor to the output, and ends with the inductor current, $I_L$, equal to zero. Optionally switch S3 162 may be held ON after the inductor current reaches zero, e.g. for boost ratios Vout/Vin<2, to store additional ZVS energy in the inductor during a Reverse Energy Phase as described in the Adaptive ZVS Patent in which case the inductor current $I_L$ will be negative when switch S3 is turned OFF at time ta. Between times ta and t3, capacitor Cp resonates with inductor L causing Vc to decline and the current $I_L$ to increase negatively, as shown in FIGS. 11A and 11B. The controller described in connection with FIGS. 8, 9A, and 9B was configured to enable the clamp circuit to conduct when Vc declines to approximately Vin at time tx, clamping the inductor current and halting the resonant exchange. In contrast, the ZVSER controller may delay conduction of the clamp circuit to a time later than time tx at which Vc=Vin. Referring to FIG. 11A, the resonant oscillation between capacitance Cp and the inductor 104 begins when switch S3 is turned OFF at time ta at which time the inductor current is zero (or negative in the case of an optional Reverse Energy Phase) and energy in the capacitance Cp (Vc=Vo>Vin) begins transferring to the inductor. Negative current continues building in the inductor from time ta until reaching a negative peak at time tx at which time capacitance Cp has been discharged to Vc=Vin. At time tx, the negative inductor current begins declining from the negative peak (at tx) as energy is removed from the capacitance Cp until time t3, when the voltage Vc across the capacitance Cp declines to zero. Between times t3 and t4, diode 158, across main switch 156, prevents Vc from ringing negative and (ideally) clamps Vc at zero volts. Preferably, switch S4 156 may be turned ON to conduct between time t3 and time t4 to reduce losses associated conduction through diode 158. As a result, the input voltage, Vin, is impressed across the inductor and the negative inductor current, $I_L$, (which returns energy to the input source) declines toward zero at an essentially constant rate equal to Vin/L. At time t4 the inductor current $I_L$ returns to zero at which point no energy remains in the inductor 104, the energy having been returned to the input source, Vin. The time interval between ta and t4 may be called an "Energy Recovery Interval" because energy is resonantly transferred from output to input ("recovered"): energy transferred from output to resonant circuit from time ta to time t3; and from resonant circuit to input source from time t3 to time t4.

Resonant Storage Interval

After time t4, the inductor current, $I_L$, goes positive and the diode 158 becomes non-conductive and switch S4 156 is OFF. Between times t4 and t7, the resonant circuit, formed by the capacitance, Cp, and the inductor, L, is driven by the input source, Vin. At time t5, the voltage Vc has rung up to Vin and the inductor current, $I_L$, reaches a peak positive value, $I_4$. At time t6, the inductor current, $I_L$, has rung down to zero and Vc has reached a peak value of 2*Vin. At time t7, Vc has rung down to equal Vin and $I_L$ has reversed and is equal $-I_4$, which is exactly the amount of energy required to discharge the capacitance, Cp, from Vin to zero, i.e. for optimal ZVS operation of switch S4. The clamp switch 103 may be closed at any time between times t5 and t7, but is preferably closed near time t5 or time t7 when Vc is equal to Vin to enable full ZVS operation of the clamp switch. Clamp switch $S_C$ 103 may typically be a much smaller switch, having much smaller parasitic capacitances than those of switches S3 and S4 which are designed to carry much higher currents, and therefore may not contribute significantly to converter losses when not operated at full ZVS. However, to minimize losses any significant reduction, e.g. by 50 percent, 80 percent, 90 percent, or more from the peak voltage across the clamp switch (Vin at time t6), respectively reduces the switching loss during turn ON of switch SC by 75 percent, 96 percent, 99 percent, or more. For example, in a boost converter the clamp switch $S_C$ 103 may be closed when Vc is 0.5 volts less than Vin if switch 103 turn-on is to coincide with time T5 or when Vc is 0.5 volts greater than Vin if switch 103 turn-on is to coincide with T7. The turn-on threshold may be chosen with a greater difference between Vc and Vin to initiate earlier turn-on of switch 103 to account for comparator and driver delays in the control circuitry. Diode 105 in the clamp circuit 102 becomes conductive at time t7 (when Vc declines to equal Vin) allowing the clamp circuit to trap energy in the inductor and begin the clamp phase. The time interval from t4 to t7, during which Vc and $I_L$ oscillate at a characteristic resonant frequency determined by the capacitance, Cp, and the inductance, L, may be called a "Resonant Storage Interval" because energy from the source is stored in the resonant circuit during this time in an amount that also determines the magnitude of the energy stored in the inductor 104 during the subsequent clamp phase (beginning at time t7). At time t8, the clamp switch is opened allowing the energy stored in the inductor to discharge capacitance, Cp, to zero volts. A new operating cycle begins at $t_0$+Top.

Comparing FIGS. 9 and 11, the magnitude, $-I_4$ (FIG. 11A), of the current trapped in the clamp circuit in a clamped discontinuous boost converter with a ZVSER controller operating at a boost ratio greater than two (such as shown in FIGS. 11A and 11B), is lower than the magnitude, $-I_C$ (FIG. 9A), of the current that would be trapped in the clamp circuit of the prior-art converter described in connection with FIGS. 9A and 9B. The clamped inductor current, $I_4$, may (ideally) have a magnitude equal to the value required for optimal ZVS. In a practical converter, losses in circuit elements in the converter and the clamp circuit, and finite voltage drops in diodes and switches, may cause operation departing from the ideal. Losses in the clamp circuit, for example, may cause the magnitude of the current at the end of the clamp phase to be lower than the magnitude at the start of the phase. As a result, full ZVS may not be achieved; however, that may not be a significant problem, because the energy in the parasitic capacitances, Cp, is a function of the square of the voltage, Vc, making switching losses associated with a relatively low voltage across the parasitic capacitance when the switch is closed also relatively small.

Buck Converter ZVSER Example

Use of the ZVSER control technique may provide similar benefits when used in a buck converter operating at a buck ratio greater than one-half. Waveforms for a clamped discontinuous buck converter comprising a ZVSER controller (e.g. the power converter 168 of FIG. 10 in which the converter 170 is a buck converter of the kind shown in FIG. 7 (or a variant, e.g. in which diode 116 is replaced by or augmented with a switch), are shown in FIGS. 12A and 12B.

Referring to FIGS. 7, 10 and 12, an operating cycle may be started with the closure of switch S1 114 at time t0. Between time t0 and t1, switch S1 is ON causing the current, $I_L$, in inductor 106 to ramp up during an energy storage phase. Switch S1 may be turned OFF at time t1, initiating a ZVS interval during which the inductor current, $I_L$, discharges the parasitic capacitances Cp 113. As shown at time t2, the voltage, Vc, across Cp 113 reaches zero volts terminating the ZVS interval and allowing the inductor current to be carried by the now conducting (ideal) diode 116. With the diode 116 conducting, energy is transferred from the inductor 106 to the output during an energy transfer phase beginning at time t2 and ending when the inductor current, $I_L$ reaches zero as shown at time ta. The ideal diode 116 in FIG. 7 in some embodiments may be implemented using a controlled switch such as a MOSFET typically including a parallel diode (which may be the body drain diode of the MOSFET) to relax the timing requirements of the controlled switch. The interval between time t0 and ta, including the energy storage phase and the energy transfer phase, may be called an energy transfer interval.

Energy Recovery Interval

Figures 12A, 12B:
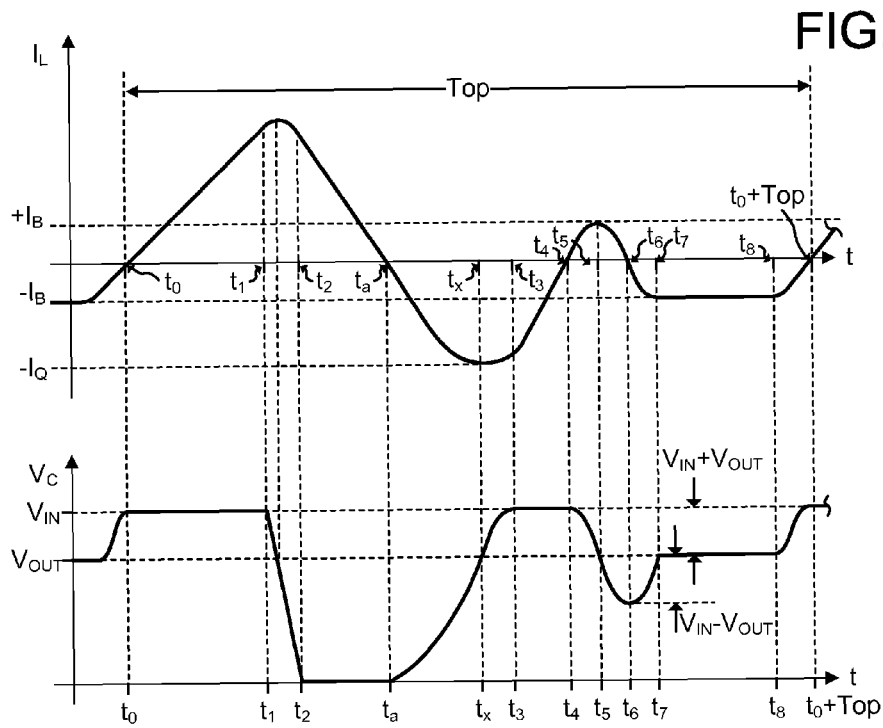
FIGS. 12A and 12B show waveforms for a clamped discontinuous mode buck switching power converter according to the invention.

An Energy Recovery Interval (similar to that described above in connection with the ZVSER Boost Converter) as shown between times ta and t4 in FIGS. 12A and 12B may be used to transfer energy from output to input source. At time ta, no energy remains in the inductor ($I_L$=0 at time ta) or in node capacitance, Cp 113 ($V_C$=0 at time ta) and a resonant oscillation begins. At time ta, under the influence of the output voltage, Vout, the inductor current, $I_L$, begins to ramp negatively building energy in the inductor and charging the node capacitances represented by capacitor, Cp 113. At time, tx, when the node capacitance Cp is charged to the output voltage, Vc=Vout, the inductor current reaches a negative peak, $I_L=-I_O$ (FIG. 12A), and the inductor current begins declining from the negative peak toward zero as energy is transferred from the inductor to the node capacitance, charging Cp 113 above Vout, $V_C$>Vout. At time t3, the node voltage, Vc, reaches the input voltage, Vin, at which point the (ideal) diode 174 across switch S1 conducts, clamping the node voltage at the input voltage level, and conducts the negative inductor current back to the input source. Between times t3 and t4, a voltage equal to (Vin-Vout) is impressed across the inductor 106, causing the inductor current, $I_L$, to decline further toward zero at an essentially constant rate equal to (Vin−Vout)/L. The Energy Recovery Interval ends at time t4 when the inductor current $I_L$ again returns to zero at which point the excess energy remaining in the inductor (from time t3 when Vc had been fully charged to Vc=Vout) has been returned to the source (via the negative inductor current).

Resonant Storage Interval

A subsequent Resonant Storage Interval (as shown from time t4 to time t7 in FIGS. 12A and 12B) may be used to resonantly store the energy required for ZVS operation of switch S1 in the inductor. Driven by a voltage equal to the difference between (a) the voltage across the node capacitance, Cp, at time t4, which is equal to the input voltage, Vc(t4)=Vin, and (b) the output voltage, Vout, i.e. Vin−Vout; the resonant circuit (comprising the inductor, L, and node capacitances represented by capacitor, Cp) begins to ring at time t4. At the start of the resonant period, the inductor current $I_L$ rings up and node voltage Vc rings down (reverse biasing diode 174) as shown from time t4 to time t5 in FIGS. 12A and 12B. Concluding the first quarter cycle of the resonant oscillation, the inductor current, $I_L$, reaches its resonant maximum ($I_L=I_B$) and the node voltage, Vc, reaches its resonant midpoint (Vc=Vout), as shown at time t5 in FIGS. 12A and 12B. At the end of the resonant half cycle, the inductor current, $I_L$, reaches its resonant midpoint vale ($I_L=0$) and the node voltage, Vc, reaches its resonant minimum (Vc=Vin−2*(Vin−Vout)). After another quarter cycle, the node voltage Vc rings back up to its midpoint value (Vc=Vout) and the inductor current, $I_L$, reaches its resonant minimum ($I_L=-I_B$). Examination of the resonant oscillation which began at time t4, reveals that the $I_L=-I_B$ is, in an ideal circuit, the exact amount of inductor current required to charge the node capacitances, Cp, from Vc=Vout to Vc=Vin, enabling an optimal ZVS transition of switch S1.

A clamp phase may follow the Resonant Storage Interval at time t7. The clamp switch 103 may be closed any time during the Resonant Storage Interval that the node voltage Vc is less than the output voltage (Vc<Vout) because the diode 105 will not conduct until Vc>Vout; therefore, the clamp switch may be closed anytime between t5 and t7. With the clamp switch 103 closed, as the node voltage Vc rises and forward biases diode 105, the clamp circuit 102 conducts as Vc reaches Vout (in an ideal circuit) ending the Resonant Storage Interval and trapping the inductor current, $I_L=-I_B$, in the inductor as shown at time t7 in FIGS. 12A and 12B. The clamp phase may be terminated by opening the clamp switch 103 at time t8 allowing the inductor current to charge the node capacitances, Cp, from Vc=Vout to Vc=Vin at which point switch S1 may be turned on with ZVS as shown at time t0+Top in FIGS. 12A and 12B. A new operating cycle begins at $t_0$+Top.

Extended Resonant Storage Interval

In the boost and buck examples of FIGS. 11 and 12, activation of the clamp circuit was delayed until after the converter completed an Energy Recovery Interval (between times to and t4) and a Resonant Storage Interval lasting three quarters of the resonant period set by the inductor and the node capacitances, Cp between times t4 and t7 as shown in FIGS. 11A, 11B and 12A, 12B. It may be advantageous in some embodiments to extend the Resonant Storage Interval beyond the minimum which consists of three quarters of the resonant period. The Resonant Storage Interval may be extended to allow for shortening of the subsequent clamp period which may result in lower overall converter losses than if there were fewer resonant cycles in the Resonant Storage Interval and the clamp period were longer. The extended Resonant Storage Interval operation may be beneficial in a converter operating with a relatively high clamp current and a relatively long clamp period, e.g. during light load conditions.

Figure 13:
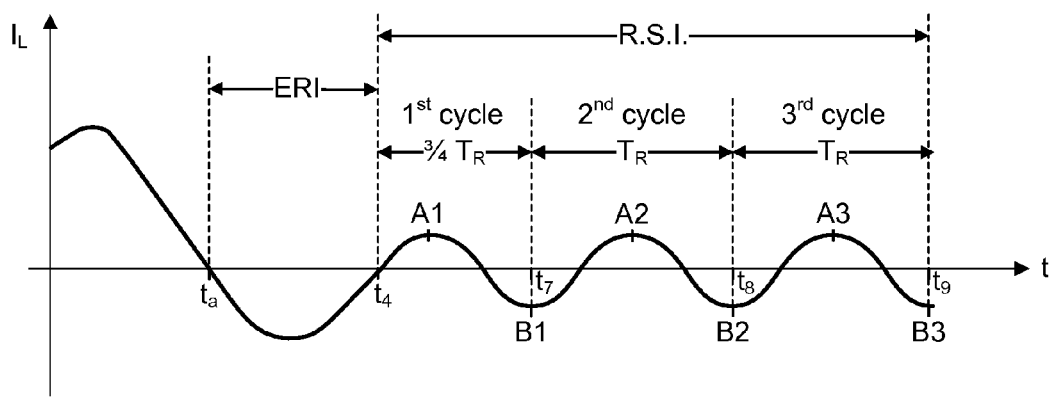
FIG. 13 shows a partial waveform of inductor current in an embodiment of a clamped discontinuous mode switching power converter according to the invention.

For example, FIG. 13 shows a portion of a waveform showing the inductor current in a converter 168 in which the Resonant Storage Interval has been extended by two resonant periods beyond the minimum, i.e. having a total duration of two and three quarter resonant cycles. The oscillations are labeled in FIG. 13 as the $1^{st}$ cycle (t4 to t7), $2^{nd}$ cycle (t7 to t8), and $3^{rd}$ cycle (t8 to t9). Note that the Resonant Storage Interval may be extended beyond the basic three-quarter period minimum by an integral number of the resonant periods. Extension by an integral number resonant periods allows the node voltage, Vc, and inductor current, $I_L$, to return to the same phase angle, and ideally to the same levels, as set up in the basic Resonant Storage Interval. Thus in FIG. 13, the $1^{st}$ cycle is depicted, as described above for the basic Resonant Storage Interval, as having a duration of three quarters of the resonant period ($\frac{3}{4}T_R$), and the $2^{nd}$ and $3^{rd}$ cycles are each depicted having a duration of one full resonant period ($T_R$). The clamp switch (e.g. 103: FIGS. 7, 8) may be activated in the same portion of the final resonant cycle, i.e. at the same phase angle which corresponds to times t5 and t7 in the basic RSI as described above. In the context of FIG. 13, the clamp switch would be closed anytime when the inductor current transitions from its resonant maximum (A1, A2, A3, . . . AN) to its next resonant minimum (B1, B2, B3, . . . BN): i.e., between A2 and B2 in the second cycle for termination at t8; between A3 and B3 in the third cycle for termination at t9, or between AN and BN for termination in the Nth resonant cycle. These intervals (from AN to BN) correspond to the times when the node voltage, Vc, is greater than the input voltage, Vin, in the case of the boost converter (FIGS. 8, 11, 13), and when the node voltage, Vc, is less than the output voltage, Vout, in the case of the buck converter (FIGS. 7, 12, 13).

ZVSER Control Method

As described above, the converter operating cycle of a clamped discontinuous buck or boost power converter using the ZVS Energy Recovery method may have: (1) an Energy Transfer or Freewheeling phase, during which a positive flow of inductor current, $I_L$, transfers energy to the output from, or via, the inductor, and which ends with the inductor current, $I_L$, equal to zero; followed by (2) an Energy Recovery Interval, during which the inductor current, $I_L$, is negative, and which ends with the inductor current, $I_L$, equal to zero; followed by (3) a Resonant Storage Interval having a duration equal to (N+¾) resonant periods, where N may be positive integer or zero, and where the resonant period is determined by the value of the capacitance across the switching node and the inductor value, characterized by a flow of inductor current, $I_L$, which: rings up from an initially near zero value to a positive maximum, and then rings down toward a negative maximum, and ends with a negative flow of $I_L$ which may (ideally) be approximately equal to the current required to achieve optimal ZVS at the end of a succeeding clamp phase; (4) an optional Clamp Phase during which the flow of current in the inductor, $I_L$, is negative and the clamp circuit is engaged to shunt the inductor current. For example, in a boost converter the inductor current may be considered approximately equal to the current required to achieve optimal ZVS at the end of the succeeding clamp phase when it is sufficient to discharge the voltage across the switch node to a level between 50% and 0% of the voltage that would be across the switch if it were not discharged for ZVS. The optimal value of ZVS may be defined as the point at which further reduction in turn-ON losses of the subject switch, e.g. reduction of the voltage across switch S4, would exceed the incremental increase in losses in other circuit elements, such as conduction losses associated with increased clamp current in the clamp circuit 102 and in the inductor 104, to achieve such further reduction. Assuming a constant capacitance Cp at the switching node Q4 turn-on loss is proportional to the square of the voltage at turn-on; reducing the turn-on voltage to 50% of Vin reduces losses to 25% and reducing turn-on voltage to 10% of Vin results in a turn-on loss to ~1% of the loss with a turn-on voltage equal to Vin. The portion of the operating cycle comprising the Energy Recovery Interval and the Resonant Storage Interval (e.g., between times ta and t7, FIGS. 11, 12; between times ta and t9, FIG. 13) may be called a "ZVSER Phase".

The ZVSER control method may delay activation of the clamp circuit, e.g. by increasing the length of the Resonant Storage Interval (increasing the number N of resonant cycles) to (a) prevent trapping excess energy in the inductor (lower inductor current during the clamp phase may reduce losses in a (non-ideal) clamp circuit) and (b) reduce the relative amount of time within an operating cycle that the clamp circuit is engaged and conducting a negative inductor current (short clamp time may improve conversion efficiency and also enabling more accurate use of open-loop, feedforward, or table-lookup control techniques as described, e.g., in the Adaptive ZVS Patent).

The ZVSER control method may be particularly advantageous in a discontinuous clamped converter operating with a long clamp period (typically corresponding to light load operation) and/or at a Vout/Vin ratio that would, in a prior-art clamped converter, result in significantly more clamp current than is required for optimal ZVS (e.g. in a boost converter with a boost ratio greater than two).

ZVSER Controller Implementation

Figure 3:
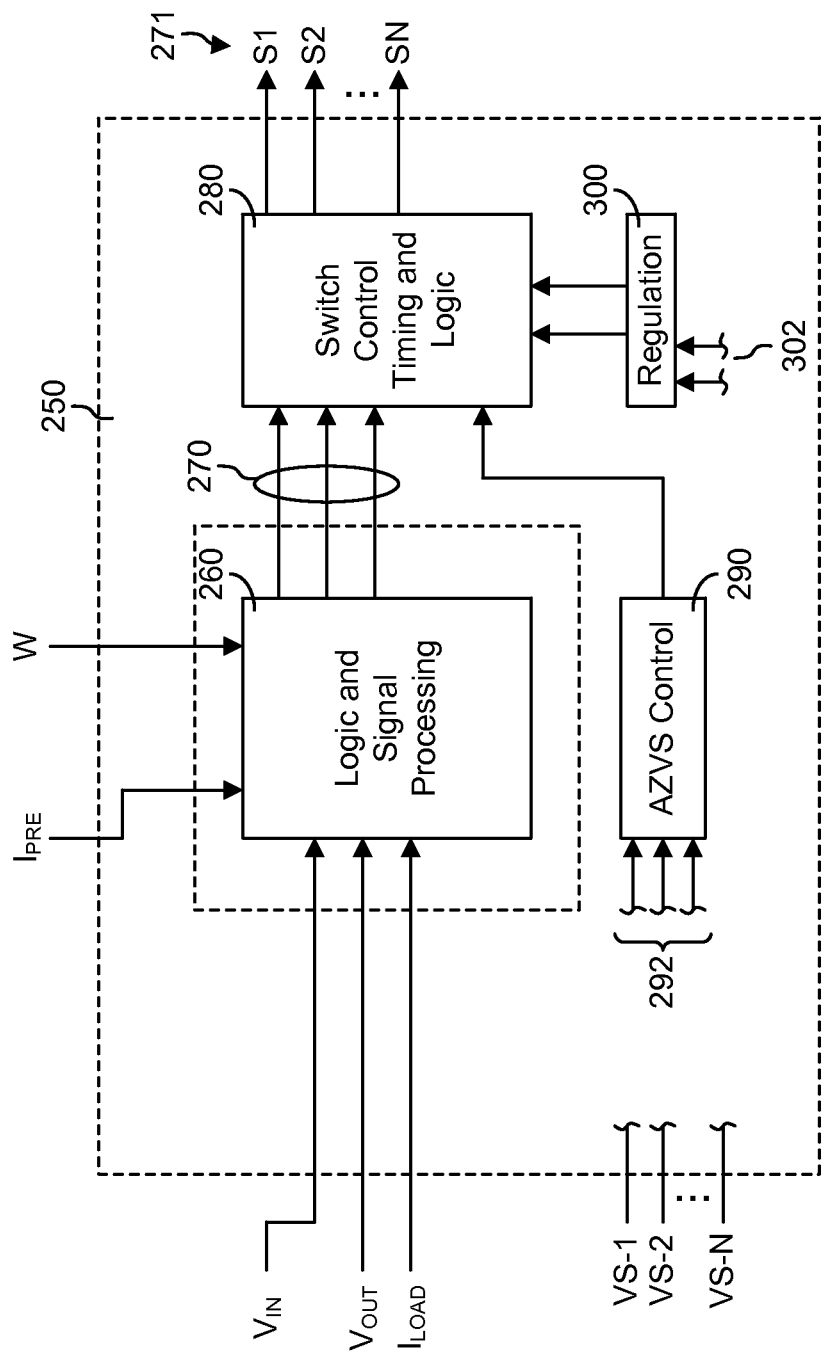
FIG. 3 shows a block diagram of an embodiment of a Zero-Voltage Switching Energy Recovery controller according to the invention.

Referring to FIG. 3, a ZVSER controller 250 for operating a discontinuous PWM converter is shown including Logic and Signal Processing Circuitry 260 configured to receive reference signals Ipre and W and may sense or receive signals indicative of conditions in the converter such as the input voltage, $V_{IN}$, output voltage, $V_{OUT}$, and load current, $I_{LOAD}$, as shown in FIG. 3. The reference value, Ipre, may be used to set a threshold level for the ZVSER controller 250 to set the conditions (i.e. when the magnitude of load current, $I_{LOAD}$, falls below Ipre) for enabling the ZVS energy recovery control method. The reference value, W, (which may be an integer number) may be used to set the desired or a maximum number of oscillation cycles in the Resonant Storage Interval when the ZVSER architecture is enabled. The reference values, Ipre and W, may be scaled, may be established as predetermined or adjustable, analog or digital, representations, which may be preset in the controller, set by circuitry or connections external to the controller, or may be looked up from memory. The controller 250 may be configured to sense, derive, or receive measurements or indications of the input voltage, $V_{IN}$, output voltage, $V_{OUT}$, and output or load current, $I_{LOAD}$, using any of a variety of known methods.

As shown in FIG. 3, the ZVSER controller 250 may have Logic and Signal Processing Circuitry 260 connected to monitor operating conditions of the converter and provide control signals 270 to Switch Control Timing and Logic Circuitry 280 which may drive the power switches in the converter via signals 271. Regulation circuitry 300 connected to the Switch Control Timing and Logic Circuitry 280 may be used to regulate the output voltage, by any of a variety of known control techniques, e.g. including voltage feedback and current feedforward techniques with input signals 302. The ZVSER controller 250 may include a AZVS Controller 290, of the type described in the Adaptive ZVS Patent, which, under appropriate operating conditions (e.g. in a boost converter, when the boost ration is less than two), may increase the length of the energy transfer phase for a controlled period of time after the positive inductor current has declined to zero, thereby increasing the magnitude of the clamp current and providing sufficient energy for ZVS.

In operation, Logic and Signal Processing Circuitry 260 may compare the load current, $I_{LOAD}$, to the reference value, $I_{PRE}$ and if $I_{LOAD}<I_{PRE}$, it may send control information 270 to the Switch Control Timing and Logic Circuitry 280 to enable the energy recovery control architecture, e.g. to initiate an Energy Recovery Interval and Resonant Storage Interval. The controller may adjust the duration of the RSI for a desired number, N, of oscillation cycles. When the ZVSER architecture is enabled, the Switch Control Timing and Logic Circuitry 280 adjusts the timing of switch signals S1, S2 . . . SN, to provide for the N oscillation cycles. A maximum number of cycles may be set using the value, W, discussed above. The controller 250 may comprise comparators, counters and digital logic circuitry and may also comprise integrated digital processors, such as microprocessor or digital signal processor circuitry.

The ZVSER controller 250 may be configured to determine a conversion ratio, R, which may be R=Vin/Vout for a buck converter or R=Vout/Vin for a boost converter, e.g., by calculation; by use of a lookup table, or internal or external circuitry. The conversion ratio, R, may be used to enable or disable the ZVSER architecture. Consider that for a boost converter operating at a high ratio (e.g. R>8, 9 or 10), the peak inductor current may be very high and significant ZVS energy may be stored in the inductor at time t3 (FIG. 11); thus, the ZVSER controller 250 may enable the ZVSER architecture to reduce the inductor current during the clamp phase (avoiding excessive dissipation in the clamp switch) and at the beginning of the operating cycle, t0 (potentially increasing the accuracy of any feedforward compensation). The ZVSER architecture may be enabled for high conversion ratios over all or substantially all output current levels, e.g. even while the converter operates in critical conduction mode. At lower conversion ratios, e.g. R in the 4 to 6 range, there may be more than enough ZVS energy stored in the inductor but under light load (e.g. low output current) conditions, a long clamp phase, e.g. 30% of the operating period, may be desirable to reduce power dissipation in the converter. The ZVSER architecture may be enabled at medium output currents (e.g. at 50% of full load), e.g. with short RSI periods (¾ of the resonant period) to avoid unnecessary dissipation in the clamp switch which may avoid loss of efficiency and degraded feed-forward control and also enable the use of a lower power clamp switch. At even lower output currents (e.g. at 33% of full load), when the desired clamp phase may be even longer than 1¾ resonant periods, an extended RSI period may be used in place of some of the clamp duration to further reduce power dissipation in the clamp. The controller may limit the length of the RSI to a number of periods set by the value W. At lower conversion ratios, R is less than or equal to 2, the ZVSER architecture may be enabled at much lighter loads (e.g at 25% of full load or less) to reduce power dissipation in the clamp. However, if the switching node (Vc) does not fall enough to cause the Q4 body diode to conduct, the ZVS energy may not be recovered.

As shown in the above examples, the controller may use the conversion ratio, R, and the load current to enable or disable the ZVSER architecture and to set the duration of the RSI from a minimum to a maximum number of periods. The value, W, may be used to set the maximum RSI for the controller. In the above examples, the reduction in power dissipation in the clamp switch may enable use of smaller semiconductor switches, which may be integrated with the controller.

Other embodiments of a ZVSER controller may assert the energy recovery method over a relatively wide range of load currents and may be configured to adapt the number of oscillation cycles based upon the magnitude of the load current and/or other converter operating conditions. A general purpose ZVSER controller may include factory programmable settings that may be set at the factory or in circuit to establish fixed operational parameters for use in the intended application. For example, the ZVSER controller (e.g. 250 in FIGS. 3, 10) may be programmed with a preset number of RSIs and invoke the ZVSER method when the output (EAO) of the voltage regulator error amplifier falls below the threshold, Ipre.

Certain embodiments of the invention have been described. Nevertheless, it will be understood that various variations and modifications may be made without departing from the spirit and scope of the invention. For example, any of a wide variety of known switching power converter topologies may be used in place of the specific converter embodiments described herein. A ZVSER controller may assert the energy recovery method over a relatively wide range of load currents and may be configured to adapt the number of oscillation cycles based upon the magnitude of the load current. Other embodiments of a ZVSER controller and/or a converter comprising a ZVSER controller may be implemented as discrete circuits or in the form of software code and/or logical instructions that are processed by a microprocessor, digital processor or other means, or any combination thereof. Logical processes in a digital controller may run concurrently or sequentially with respect to each other or with respect to other processes, such as measurement processes and related calculations. ZVSER controllers may be implemented in mixed-signal circuitry; in circuitry comprising mixed-signal circuitry comprising a digital processor core; or in circuitry comprising a combination of mixed-signal circuitry and a separate digital signal processor. They may be implemented as, or as part of, an integrated circuit or a hybrid device. There may also be additional logical processes that may not be shown, such as, e.g., safety and protection mechanisms; timing and frequency generation mechanisms; and hardware and processes related to regulatory requirements. Pre-determined values, such as, e.g., the pre-determined values of W and Ipre, may be stored in read-only or re-programmable non-volatile memory or other storage media. Comparisons and ratios may be determined by a variety of known means, including, but not limited to, digital calculation or lookup table methods. Communication means may also be incorporated into the converter and/or controller as a means of downloading commanded values or other operating information to the converter and/or for uploading converter operating information to user equipment. It is understood that all such variations are within the scope of the disclosure.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and its practical application to enable one skilled in the art to utilize the disclosure in various embodiments and with various modifications as are suited to the particular use contemplated.

What is claimed is:

1. A method comprising:
   providing switching power conversion circuitry comprising an inductor and one or more switches connected to deliver energy from an input source to an output at an output voltage during a converter operating cycle;
   providing clamp circuitry connected across the inductor and being arranged to conduct a current flowing in the inductor when ON;
   providing control circuitry configured to operate the one or more switches and the clamp circuitry in a series of converter operating cycles, the converter operating cycles comprising:
   (a) an energy transfer interval, during which energy is transferred from the input to the output via the inductor, and which is characterized by (i) a substantially zero current flowing in the inductor at the beginning of the interval; (ii) an average positive flow of current in the inductor during the interval, the average being taken over the duration of the interval; (iii) a reversal in polarity of a voltage across the inductor during the interval, and (iv) a substantially zero current flowing in the inductor at the end of the interval;
   (b) an energy recovery phase, during which the current flowing in the inductor oscillates and which is characterized by the current flowing in the inductor transitioning from (i) substantially zero to a first negative value, (ii) from the first negative value to a first positive value, and (iii) from the first positive value toward zero; and
   (c) a clamp phase, during which energy is trapped in the inductor, and which is characterized by: (i) an average negative current flowing in the inductor during the phase, the average being taken over the duration of the clamp phase; (ii) the magnitude of negative current flowing in the inductor at the end of the clamp phase is greater than zero; and (iii) the clamp circuitry is ON for at least a portion of the phase.

2. The method of claim 1 wherein providing switching power conversion circuitry comprises providing buck switching power conversion circuitry.

3. The method of claim 1 wherein providing switching power conversion circuitry comprises providing boost switching power conversion circuitry.

4. The method of claim 1 wherein the energy recovery phase ends with the current flowing in the inductor returning to a second negative value; and the clamp phase begins after the energy recovery phase.

5. The method of claim 1 wherein the control circuitry is configured to begin the clamp phase when the magnitude of the current in the inductor is substantially equal to the current required to reduce a switch voltage by 50% at the end of the clamp cycle.

6. The method of claim 4 wherein the energy recovery phase comprises: (i) an Energy Recovery Interval during which a negative current flows in the inductor and which ends when the current flowing in the inductor returns to zero; and (ii) a Resonant Storage Interval comprising at least a portion of one oscillation during which the current flowing in the inductor transitions from zero to the first positive value and from the first positive value to the second negative value.

7. The method of claim 6 wherein the Resonant Storage Interval further comprises a number N of oscillations during which the current flowing in the inductor transitions from the second negative value to a positive value returning to the second negative value.

8. The method of claim 6 wherein the control circuitry is configured to terminate the energy recovery phase at a time when the second negative value is substantially equal to the current required to reduce a switch voltage by 50% at the end of the clamp cycle.

9. The method of claim 1 wherein providing clamp circuitry comprises providing a clamp switch in series with a diode.

10. The method of claim 1 wherein providing clamp circuitry comprises providing a pair of clamp switches connected in series, each clamp switch comprising a diode connected across the switch, the polarities of the switches and diodes configured such that neither diode can conduct a current unless at least one of the pair of clamp switches is turned ON.

11. The method of claim 6 wherein the control circuitry is configured to selectively alter the energy recovery phase as a function of converter operating conditions.

12. The method of claim 11 wherein selectively altering the energy recovery phase comprises terminating the energy recovery phase during the Energy Recovery Interval.

13. The method of claim 11 wherein selectively altering the energy recovery phase comprises:
determining a ratio, R=Vout/Vin, where Vout is a magnitude of a converter output voltage, and Vin is a magnitude of a converter input voltage; and
configuring the control circuitry to terminate the energy recovery phase during the Energy Recovery Interval when the ratio, R=Vout/Vin, is less than or equal to a pre-determined value.

14. The method of claim 13 wherein:
providing switching power conversion circuitry comprises providing boost switching power conversion circuitry, and the predetermined value is less than or equal to 2.

15. The method of claim 13 wherein:
providing switching power conversion circuitry comprises providing buck switching power conversion circuitry, and the predetermined value is less than or equal to one-half.

16. The method of claim 11 wherein selectively altering the energy recovery phase comprises:
determining a magnitude of a current delivered to the output, and
terminating the energy recovery phase during the Energy Recovery Phase if the magnitude of the output current is above a pre-determined threshold.

17. The method of claim 12 wherein the energy recovery phase is terminated at a time when the magnitude of the current in the inductor is negative and sufficient to reduce a switch voltage by 50% at the end of the clamp cycle.

18. The method of claim 12 further comprising turning one of the one or more switches ON at or near a time when a polarity of voltage across the switch changes and a negative current is flowing in the inductor during the energy recovery phase.

19. The method of claim 1 wherein the control circuitry is configured to begin the clamp phase when the magnitude of the current in the inductor is substantially equal to the current required to reduce a switch voltage by 80% at the end of the clamp cycle.

20. The method of claim 6 wherein the control circuitry is configured to terminate the energy recovery phase at a time when the second negative value is substantially equal to the current required to reduce a switch voltage by 80% at the end of the clamp cycle.

21. The method of claim 12 wherein the energy recovery phase is terminated at a time when the magnitude of the current in the inductor is negative and sufficient to reduce a switch voltage by 80% at the end of the clamp cycle.

22. The method of claim 1 wherein the control circuitry is configured to begin the clamp phase when the magnitude of the current in the inductor is substantially equal to the current required to reduce a switch voltage by 90% at the end of the clamp cycle.

23. The method of claim 6 wherein the control circuitry is configured to terminate the energy recovery phase at a time when the second negative value is substantially equal to the current required to reduce a switch voltage by 90% at the end of the clamp cycle.

24. The method of claim 12 wherein the energy recovery phase is terminated at a time when the magnitude of the current in the inductor is negative and sufficient to reduce a switch voltage by 90% at the end of the clamp cycle.

25. A system comprising:
switching power conversion circuitry comprising an inductor and one or more switches connected to deliver energy from an input source to an output at an output voltage during a converter operating cycle;
clamp circuitry connected across the inductor and arranged to conduct a current flowing in the inductor when ON; and
control circuitry configured to operate the one or more switches and the clamp circuitry in a series of converter operating cycles comprising:
 (a) an energy transfer interval, during which energy is transferred from the input to the output via the inductor, and which is characterized by (i) a substantially zero current flowing in the inductor at the beginning of the interval; (ii) an average positive flow of current in the inductor during the interval, the average being taken over the duration of the interval; (iii) a reversal in polarity of a voltage across the inductor during the interval, and (iv) a substantially zero current flowing in the inductor at the end of the interval;
 (b) an energy recovery phase, during which the current flowing in the inductor oscillates and which is characterized by the current flowing in the inductor transitioning from (i) substantially zero to a first negative value, (ii) from the first negative value to a first positive value, and (iii) from the first positive value toward zero; and (c) a clamp phase, during which energy is trapped in the inductor, and which is characterized by: (i) an average negative current flowing in the inductor during the phase, the average being taken over the duration of the clamp phase; (ii) the magnitude of negative current flowing in the inductor at the end of the clamp phase is greater than zero; and (iii) the clamp circuitry is ON for at least a portion of the phase.

* * * * *